(12) United States Patent
Francisco et al.

(10) Patent No.: US 12,015,119 B2
(45) Date of Patent: Jun. 18, 2024

(54) SOLID ELECTROLYTE MATERIAL AND SOLID-STATE BATTERY MADE THEREWITH

(71) Applicant: Solid Power, Inc., Louisville, CO (US)

(72) Inventors: Brian E. Francisco, Arvada, CO (US); Sean P. Culver, Broomfield, CO (US)

(73) Assignee: Solid Power Operating, Inc., Louisville, CO (US)

( * ) Notice: Subject to any disclaimer, the term of this patent is extended or adjusted under 35 U.S.C. 154(b) by 130 days.

(21) Appl. No.: 17/448,648

(22) Filed: Sep. 23, 2021

(65) Prior Publication Data

US 2022/0093966 A1 Mar. 24, 2022

Related U.S. Application Data

(60) Provisional application No. 63/082,146, filed on Sep. 23, 2020.

(51) Int. Cl.
*H01M 10/0562* (2010.01)
*C01G 30/00* (2006.01)
(Continued)

(52) U.S. Cl.
CPC ...... *H01M 10/0562* (2013.01); *C01G 30/003* (2013.01); *C01G 30/008* (2013.01); *H01M 4/623* (2013.01); *H01M 4/625* (2013.01); *H01M 10/052* (2013.01); *H01M 10/0585* (2013.01); *C01P 2002/72* (2013.01);
(Continued)

(58) Field of Classification Search
CPC .. H01M 10/0562; H01M 4/623; H01M 4/625; H01M 10/052; H01M 10/0585; H01M 2004/021; H01M 2300/0068
See application file for complete search history.

(56) References Cited

U.S. PATENT DOCUMENTS 8,075,865 B2 12/2011 Deiseroth et al.
2016/0028108 A1* 1/2016 Hashimoto ........... H01M 4/623
156/60
(Continued)

FOREIGN PATENT DOCUMENTS

CN 110085908 A * 8/2019 ............. C01D 15/00
EP 3598462 A1 1/2020
(Continued)

OTHER PUBLICATIONS

Machine translation of CN-110085908-A, retrieved Jun. 20, 2023 (Year: 2023).*

(Continued)

*Primary Examiner* — Milton I Cano
*Assistant Examiner* — Albert Michael Hilton
(74) *Attorney, Agent, or Firm* — Polsinelli PC; Gregory P. Durbin (57) ABSTRACT

A solid electrolyte material comprises Li, T, X and A wherein T is at least one of Sb, P, As, Si, Ge, Al, and B; X is one or more halogens or N; A is one or more of S or Se. The solid electrolyte material has peaks at 2θ=14.5°±0.50°, 16.8°±0.50°, 23.9°±0.50°, 28.1°±0.50°, and 32.5°±0.50 in X-ray diffraction measurement with Cu-Kα(1,2)=1.54064 Å and may include glass ceramic and/or mixed crystalline phases.

29 Claims, 4 Drawing Sheets

(51) Int. Cl.
*H01M 4/62* (2006.01)
*H01M 10/052* (2010.01)
*H01M 10/0585* (2010.01)
*H01M 4/02* (2006.01)

(52) U.S. Cl.
CPC ... *C01P 2006/40* (2013.01); *H01M 2004/021* (2013.01); *H01M 2300/0068* (2013.01)

(56) References Cited

U.S. PATENT DOCUMENTS

| | | | | |
|---|---|---|---|---|
| 2018/0183044 | A1* | 6/2018 | Yamauchi | H01M 10/054 |
| 2018/0205112 | A1* | 7/2018 | Thomas-Alyea | H01M 4/0404 |
| 2018/0287206 | A1* | 10/2018 | Makino | H01M 4/139 |
| 2019/0198919 | A1* | 6/2019 | Makino | H01M 4/1393 |
| 2019/0312270 | A1* | 10/2019 | Yoshioka | H01M 4/387 |
| 2020/0087155 | A1 | 3/2020 | Rupert | |
| 2020/0373612 | A1* | 11/2020 | Yamada | H01B 1/10 |

FOREIGN PATENT DOCUMENTS

| | | | |
|---|---|---|---|
| KR | 20180036410 A | 4/2018 | |
| WO | WO-2018168754 A1 * | 9/2018 | C03C 10/00 |
| WO | 2019207951 A1 | 10/2019 | |

OTHER PUBLICATIONS

Nanda, S., Bhargav, A., & Manthiram, A. (2020). Joule, 4(5), 1121-1135 (Year: 2020).*

Zhang, J. G. (2019). Nature Energy, 4(8), 637-638 (Year: 2019).*

International Searching Authority, International Search Report and Written Opinion, issued in connection with International Application No. PCT/US2021/051773, dated May 31, 2022 (11 pages).

Huber, S. et al., The Fourfold Superstructure in Li3Sb11S18, Monatsh Chemical, 149:487-491, Jan. 18, 2018 (5 pages).

* cited by examiner

SOLID ELECTROLYTE MATERIAL AND SOLID-STATE BATTERY MADE THEREWITH

CROSS-REFERENCE TO RELATED APPLICATIONS

This application claims priority to U.S. Provisional Patent Application No. 63/082,146, filed Sep. 23, 2020, the content of which is incorporated by reference in its entirety.

FIELD

Various embodiments described herein relate to the field of solid-state primary and secondary electrochemical cells, electrodes and electrode materials, electrolyte and electrolyte compositions and corresponding methods of making and using same

BACKGROUND

From phones and laptops to scooters and cars, the integration of rechargeable lithium ion batteries into the technologies around us has increased year over year. However, rechargeable lithium ion batteries contain flammable liquid electrolytes which not only pose a safety risk, but restrict the use of high energy density anode materials, such as lithium metal, thereby limiting the batteries' performance potential. To avoid both of these problems, the flammable liquid electrolyte can be replaced by a solid-state electrolyte.

Some of the most promising solid-state electrolytes are sulfide-based due to their high room temperature conductivity and can be synthesized using light elements, such as Lithium (Li), Phosphorous (P), and Sulfur (S) among others. One of the first sulfide solid electrolytes was the Lithium Argyrodite (U.S. Pat. No. 8,075,865) having the formula $Li^+_{(12-n-x)}B^{n+}X^{2-}_{6-x}Y^{-x}$, where $B^{n+}$ is selected from the group consisting of P, As, Ge, Ga, Sb, Si, Sn, Al, In, Ti, V, Nb, and Ta; $X^{2-}$ is selected from the group consisting of S, Se, and Te; $Y^-$ is selected from the group consisting of Cl, Br, I, F, CN, OCN, SCN, and N3; $0 \leq x \leq 2$. Another Argyrodite family member is a solid electrolyte material having a composition according to the formula $Li_{7+x-y}M_xSb_{1-x}S_{6-y}X_y$, wherein M is one or more selected from the group consisting of Si, Ge and Sn; $0<x<1$; and X is one or more selected from the group consisting of Cl, Br and I; $0.05<y<2$ (WO2021013824). These materials of the Argyrodite family showed a high ionic conductivity.

However, one disadvantage of sulfide electrolytes is that they have poor air stability due to the ease of breaking the P—S bonds within their structure and forming P—O bonds when in contact with oxygen and moisture. The forming of the P—O bonds degrades the electrolyte ionic conductivity and promotes the release of hydrogen sulfide gas. One way to circumvent this issue has been to incorporate oxygen-containing species into well-established sulfide electrolyte materials such as in US Pub. No.: US2020/0087155 or in WO2019/207951. In these documents, oxygen is incorporated into a material with an Argyrodite structuring forming a $Li_6PS_4OCl$ argyrodite or into a $Li_3PS_4$ material creating a $Li_3PS_3O$ material. Unfortunately, these materials tend to have low ionic conductivity and requires very high temperatures to produce. To overcome these problems, a novel sulfide electrolyte has been synthesized and disclosed herein, which has proper stoichiometries, exhibits a novel structure with both high conductivity, improved air stability, and low temperature processing requirements.

SUMMARY

This application is directed to a solid electrolyte material comprising Li, T, X and A, wherein T comprises at least one element selected from the group consisting of Sb, P, As, Si, Ge, Al, B, and W; X comprises one or more halogens, pseudo-halogens, or N; A comprises one or more of S or Se; and wherein the solid electrolyte material has peaks at $2\theta=14.5°\pm0.50°$, $16.8°\pm0.50°$, $23.9°\pm0.50°$, $28.1°\pm0.50°$, and $32.5°\pm0.50$ in X-ray diffraction measurement with Cu-K$\alpha$(1,2)=1.54064 Å.

In one embodiment, the solid electrolyte material comprises a formula $Li1-a-b-cTaAbXc$ wherein $0.074<a\leq0.105$, $0.370<b\leq0.421$, $0.074<c\leq0.105$.

In another embodiment of the solid electrolyte material, T comprises a blend of Sb and non-Sb elements selected from the group consisting of Sb, P, As, Si, Ge, Al, B, and W.

In another embodiment of the solid electrolyte material, a proportion of Sb to total element T is 1% or greater.

In another embodiment of the solid electrolyte material, $a=0.1$, $b=0.4$, $c=0.1$, T=Sb, A=S, and X=I.

In another embodiment of the solid electrolyte material, at least one of glass ceramic phases, crystalline phases and mixed phases is included.

In another embodiment of the solid electrolyte material, the mixed phases comprise other crystalline phases containing peaks at $20.2°\pm0.50°$ and $23.6°\pm0.50°$, and/or $21.0°\pm0.50°$ and $28.0°\pm0.50°$, and/or $17.5°\pm0.50°$ and $18.2°\pm0.50°$, and/or $17.1°$ and $25.8°$ in X-ray diffraction measurement with Cu-K$\alpha$(1,2)=1.5418 Å.

In another embodiment of the solid electrolyte material, an ionic conductivity greater than about 0.500 mS/cm at room temperature is included.

In an alternative embodiment, this application is directed to a lithium solid-state battery comprising a positive electrode active material layer containing a positive electrode active material; a negative electrode active material layer containing a negative electrode active material; and a solid electrolyte layer disposed between the positive electrode active material layer and the negative electrode active material layer, wherein at least one of the positive electrode active material layer, the negative electrode active material layer, and the solid electrolyte layer comprises a solid electrolyte material comprising Li, T, X and A, wherein T comprises at least one element selected from the group consisting of Sb, P, As, Si, Ge, Al, B, and W; X comprises one or more halogens, pseudo-halogens, or N; A comprises one or more of S or Se; and wherein the solid electrolyte material has peaks at $2\theta=14.5°\pm0.50°$, $16.8°\pm0.50°$, $23.9°\pm0.50°$, $28.1°\pm0.50°$, and $32.5°\pm0.50$ in X-ray diffraction measurement with Cu-K$\alpha$(1,2)=1.54064 Å.

In another embodiment of the lithium solid-state battery, the solid electrolyte material comprises the formula $Li1-a-b-cTaAbXc$ wherein $0.074<a\leq0.105$, $0.370<b\leq0.421$, $0.074<c\leq0.105$.

In another embodiment of the lithium solid-state battery, T comprises a blend of Sb and non-Sb elements selected from the group consisting of Sb, P, As, Si, Ge, Al, B, and W.

In another embodiment of the lithium solid-state battery, a proportion of Sb to total element T is 1% or greater.

In another embodiment of the lithium solid-state battery, the formula $Li_{1-a-b-c}T_aA_bX_c$ includes $a=0.1$, $b=0.4$, $c=0.1$, T=Sb, A-S, and X=I.

In another embodiment of the lithium solid-state battery, at least one at least one solid-electrolyte material comprising glass ceramic phases, crystalline phases and mixed phases is included.

In another embodiment of the lithium solid-state battery, the mixed phases comprise other crystalline phases containing peaks at 20.2°±0.50° and 23.6°±0.50°, and/or 21.0°±0.50° and 28.0°±0.50°, and/or 17.5°±0.50° and 18.2°±0.50°, and/or 17.1° and 25.8° in X-ray diffraction measurement with Cu-K$\alpha$(1,2)=1.5418 Å.

In another embodiment of the lithium solid-state battery, a solid-electrolyte material with an ionic conductivity greater than about 0.500 mS/cm$^2$ at room temperature is included.

In another embodiment of the lithium solid-state battery, the positive electrode active material comprises one or more particles, wires, or filaments comprising at least one of aluminum, nickel, titanium, stainless steel, magnesium, iron, zinc, indium, germanium, silver, platinum, gold, lithium or alloy thereof.

In another embodiment of the lithium solid-state battery, the negative electrode active material comprises at least one of an alkali metal comprising lithium metal, lithium alloys, sodium metal, sodium alloys, potassium metal, potassium alloys; or at least one of an alkali earth metal comprising magnesium metal, magnesium alloys, calcium metal, calcium alloys.

In another embodiment of the lithium solid-state battery, the negative electrode active material further comprises silicon, tin, iron, germanium, or indium.

In another embodiment of the lithium solid-state battery, the positive electrode active material layer and the negative electrode active material layer each comprise one or more carbon containing materials comprising carbon fiber, graphite, graphene, carbon black, conductive carbon, amorphous carbon, VGCF, and carbon nanotubes.

In another embodiment of the lithium solid-state battery, the carbon containing materials are added in the amount of 2% by mass to 50% by mass.

In another embodiment of the lithium solid-state battery, the carbon containing materials are added in the amount of 6% by mass to 30% by mass.

In another embodiment of the lithium solid-state battery, the carbon containing materials are added in the amount of 8% by mass to 25% by mass.

In another embodiment of the lithium solid-state battery, the carbon containing materials are added in the amount of 10% by mass to 20% by mass.

In another embodiment of the lithium solid-state battery, the carbon containing materials are added in the amount of 12% by mass to 18% by mass.

In another embodiment of the lithium solid-state battery, the carbon containing materials are added in the amount of 2% by mass to 50% by mass.

In another embodiment of the lithium solid-state battery, the positive electrode layer and the negative electrode layer each comprise one or more of metal particles, filaments, or other structures.

In another embodiment of the lithium solid-state battery, the positive electrode layer and the negative electrode layer each comprise one or more binders or polymers comprising a fluororesin containing vinylidene fluoride (VdF), hexafluoropropylene (HFP), tetrafluoroethylene (TFE), and derivatives thereof.

In another embodiment of the lithium solid-state battery, the positive electrode layer and the negative electrode layer each comprise one or more binders or polymers comprising homopolymers comprising polyvinylidene fluoride (PVdF), polyhexafluoropropylene (PHFP), or polytetrafluoroethylene (PTFE), or binary copolymers comprising copolymers of VdF and HFP comprising poly(vinylene difluoride-hexafluoropropylene) copolymer (PVdF-HFP).

In another embodiment of the lithium solid-state battery, the positive electrode layer and the negative electrode layer each comprise one or more binders or polymers comprising thermoplastic elastomers comprising styrene-butadiene rubber (SBR), styrene-butadiene-styrene copolymer (SBS), styrene-isoprene block copolymer (SIS), styrene-ethylene-butylene-styrene (SEBS), polyacrylonitrile (PAN), nitrile-butylene rubber (NBR), polybutadiene, polyisoprene, or poly(methacrylate) nitrile-butadiene rubber (PMMA-NBR).

In another embodiment of the lithium solid-state battery, the positive electrode layer and the negative electrode layer each comprise one or more binders or polymers comprising an acrylic resin comprising polymethyl (meth) acrylate, polyethyl (meth) acrylate, polyisopropyl (meth) acrylate polyisobutyl (meth) acrylate, polybutyl (meth) acrylate.

In another embodiment of the lithium solid-state battery, the positive electrode layer and the negative electrode layer each comprise one or more binders or polymers comprising a polycondensation polymer comprising polyurea, polyamide paper, or polyimide, polyester.

In another embodiment of the lithium solid-state battery, the positive electrode layer and the negative electrode layer each comprise one or more binders or polymers comprising nitrile rubber comprising acrylonitrile-butadiene rubber (ABR), polystyrene nitrile-butadiene rubber (PS—NBR), or mixtures thereof.

In another embodiment of the lithium solid-state battery, the positive electrode layer and the negative electrode layer each comprise one or more binders or polymers present in the amount of 1% mass to 80% by mass.

In another embodiment of the lithium solid-state battery, the positive electrode layer and the negative electrode layer each comprise one or more binders or polymers present in the amount of 3% by mass to 70% by mass.

In another embodiment of the lithium solid-state battery, the positive electrode layer and the negative electrode layer each comprise one or more binders or polymers present in the amount of 5% by mass to 60% by mass.

In another embodiment of the lithium solid-state battery, the positive electrode layer and the negative electrode layer each comprise one or more binders or polymers present in the amount of 8% by mass to 50% by mass.

In another embodiment of the lithium solid-state battery, the positive electrode layer and the negative electrode layer each comprise one or more binders or polymers present in the amount of 11% by mass to 40% by mass.

In another embodiment of the lithium solid-state battery, the positive electrode layer and the negative electrode layer each comprise one or more binders or polymers present in the amount of 14% by mass to 30% by mass.

In another embodiment of the lithium solid-state battery, the negative electrode active material possesses sufficient electronic activity and mechanical strength so as to act as the negative electrode and wherein the negative electrode is absent.

In another embodiment of the lithium solid-state battery, the positive electrode active material layer comprises Li(Ni$_a$Co$_b$Mn$_c$)O$_2$ wherein 0<a≤1, 0<b≤1, 0<c≤1, a+b+c=1.

In another embodiment of the lithium solid-state battery, the positive electrode active material layer comprises Li(Ni$_{0.33}$Co$_{0.33}$Mn$_{0.33}$)O$_2$, Li(Ni$_{0.4}$Co$_{0.3}$Mn$_{0.3}$)O$_2$, Li(Ni$_{0.5}$Co$_{0.2}$Mn$_{0.3}$)O$_2$, Li(Ni$_{0.6}$Co$_{0.2}$Mn$_{0.2}$)O$_2$, Li(Ni$_{0.8}$Co$_{0.1}$Mn$_{0.1}$)O$_2$ or a combination thereof.

In another embodiment of the lithium solid-state battery, the positive electrode active material layer comprises one or more metal oxides comprising V$_2$O$_5$, V$_6$O$_{13}$, MoO$_3$, LiCoO$_2$, LiNiO$_2$, LiMnO$_2$, LiMn$_2$O$_4$, LiNi$_{1-Y}$Co$_Y$O$_2$, LiCo$_{1-Y}$Mn$_Y$O$_2$, LiNi$_{1-Y}$Mn$_Y$O$_2$ (0≤Y<1), Li(Ni$_a$Co$_b$Mn$_c$)O$_4$ (0<a<2, 0<b<2, 0<c<2, a+b+c=2), LiMn$_2$—ZNiZO$_4$, LiMn$_{2-Z}$Co$_Z$O$_4$ (0<Z<2), LiCoPO$_4$, LiFePO$_4$, CuO, Li(Ni$_a$Co$_b$Al$_c$)O$_2$ (0<a<1, 0<b<1, 0<c<1, a+b+c=1) or a combination thereof.

In another embodiment of the lithium solid-state battery, the positive electrode active material layer comprises one or more of a metal sulfide including titanium sulfide (TiS$_2$), molybdenum sulfide (MoS$_2$), iron sulfide (FeS, FeS$_2$), copper sulfide (CuS), nickel sulfide (Ni$_3$S$_2$) and lithium sulfide (Li$_2$S), or combination thereof.

In another embodiment of the lithium solid-state battery, the positive electrode active material is present in the amount of 20% by mass to 99% by mass.

In another embodiment of the lithium solid-state battery, the positive electrode active material is present in the amount of 30% by mass to 95% by mass.

In another embodiment of the lithium solid-state battery, the positive electrode active material is present in the amount of 40% by mass to 92.5% by mass.

In another embodiment of the lithium solid-state battery, the positive electrode active material is present in the amount of 50% by mass to 90% by mass.

In another embodiment of the lithium solid-state battery, the positive electrode active material is present in the amount of 60% by mass to 87.5% by mass.

In another embodiment of the lithium solid-state battery, the positive electrode active material is present in the amount of 65% by mass to 85% by mass.

In another embodiment of the lithium solid-state battery, the negative electrode active material is present in the amount of 20% by mass to 99% by mass.

In another embodiment of the lithium solid-state battery, the negative electrode active material is present in the amount of 30% by mass to 95% by mass.

In another embodiment of the lithium solid-state battery, the negative electrode active material is present in the amount of 40% by mass to 92.5% by mass.

In another embodiment of the lithium solid-state battery, the negative electrode active material is present in the amount of 50% by mass to 90% by mass.

In another embodiment of the lithium solid-state battery, the negative electrode active material is present in the amount of 60% by mass to 87.59% by mass.

In another embodiment of the lithium solid-state battery, the negative electrode active material is present in the amount of 65% by mass to 85% by mass.

In another embodiment of the lithium solid-state battery, the positive electrode active material layer comprises one or more of Li$_2$S—P$_2$S$_5$, Li$_2$S—P$_2$S$_5$—LiI, Li$_2$S—P$_2$S$_5$—GeS$_2$, Li$_2$S—P$_2$S$_5$—Li$_2$O, Li$_2$S—P$_2$S$_5$—Li$_2$O—LiI, Li$_2$S—P$_2$S$_5$—LiI—LiBr, Li$_2$S—SiS$_2$, Li$_2$S—SiS$_2$—LiI, Li$_2$S—SiS$_2$—LiBr, Li$_2$S—S—SiS$_2$—LiCl, Li$_2$S—S—SiS$_2$—B$_2$S$_3$—LiI, Li$_2$S—SiS$_2$—P$_2$S$_5$—LiI, Li$_2$S—B$_2$S$_3$, Li$_2$S—P$_2$S$_5$—Z$_m$S$_n$ (where m and n are positive numbers, and Z is Ge, Zn or Ga), Li$_2$S—GeS$_2$, Li$_2$S—S—SiS$_2$—Li$_3$PO$_4$, and Li$_2$S—S—SiS$_2$-Li$_x$MO$_y$ (where x and y are positive numbers, and M is P, Si, Ge, B, Al, Ga or In).

In another embodiment of the lithium solid-state battery, the positive electrode active material layer comprises one or more of Li$_3$PS$_4$, Li$_4$P$_2$S$_6$, Li$_7$P$_3$S$_{11}$, Li$_{10}$GeP$_2$S$_{12}$, Li$_{10}$SnP$_2$S$_{12}$.

In another embodiment of the lithium solid-state battery, the positive electrode active material layer comprises one or more of Li$_6$PS$_5$Cl, Li$_6$PS$_5$Br, Li$_6$PS$_5$I or expressed by the formula Li$_{7-y}$PS$_{6-y}$X$_y$, wherein X represents at least one halogen elements and or pseudo-halogen and where 0<y≤2.0 and wherein a halogen comprises one or more of F, Cl, Br, I, and a pseudo-halogen comprises one or N, NH, NH$_2$, NO, NO$_2$, BF$_4$, BH$_4$, AlH$_4$, CN, and SCN.

In another embodiment of the lithium solid-state battery, the positive electrode active material layer comprises one of more of a Li$_{8-y-z}$P$_2$S$_{9-y-z}$X$_y$W$_z$ wherein X and W represents at least one halogen elements and or pseudo-halogen and wherein 0≤y≤1 and 0≤z≤1) and wherein a halogen comprises one or more of F, Cl, Br, I, and a pseudo-halogen comprises one or N, NH, NH$_2$, NO, NO$_2$, BF$_4$, BH$_4$, AlH$_4$, CN, and SCN.

In another embodiment of the lithium solid-state battery, the positive electrode active material layer comprises a thickness in the range of 1 micron to 1000 microns.

In another embodiment of the lithium solid-state battery, the positive electrode active material layer comprises a thickness in the range of 2 micron to 900 microns.

In another embodiment of the lithium solid-state battery, the positive electrode active material layer comprises a thickness in the range of 1 micron to 100 microns.

In another embodiment of the lithium solid-state battery, the positive electrode active material layer comprises a thickness in the range of 5 micron to 750 microns.

In another embodiment of the lithium solid-state battery, the positive electrode active material layer comprises a thickness in the range of 10 micron to 500 microns.

In another embodiment of the lithium solid-state battery, the positive electrode active material layer comprises a thickness in the range of 15 micron to 350 microns.

In another embodiment of the lithium solid-state battery, the positive electrode active material layer comprises a thickness in the range of 20 micron to 200 microns.

In another embodiment of the lithium solid-state battery, the positive electrode active material layer comprises a thickness in the range of 25 micron to 100 microns.

In another embodiment of the lithium solid-state battery, the negative electrode active material layer comprises a thickness in the range of 500 nanometer to 1000 microns.

In another embodiment of the lithium solid-state battery, the negative electrode active material layer comprises a thickness in the range of 1 micron to 900 microns.

In another embodiment of the lithium solid-state battery, the negative electrode active material layer comprises a thickness in the range of 5 micron to 750 microns.

In another embodiment of the lithium solid-state battery, the negative electrode active material layer comprises a thickness in the range of 10 micron to 500 microns.

In another embodiment of the lithium solid-state battery, the negative electrode active material layer comprises a thickness in the range of 15 micron to 350 microns.

In another embodiment of the lithium solid-state battery, the negative electrode active material layer comprises a thickness in the range of 20 micron to 200 microns.

In another embodiment of the lithium solid-state battery, the negative electrode active material layer comprises a thickness in the range of 25 micron to 100 microns.

In another embodiment of the lithium solid-state battery, the solid electrolyte layer comprises a thickness in the range of 500 nanometer to 1000 microns.

In another embodiment of the lithium solid-state battery, the solid electrolyte layer comprises a thickness in the range of 1 micron to 900 microns.

In another embodiment of the lithium solid-state battery, the solid electrolyte layer comprises a thickness in the range of 5 micron to 750 microns.

In another embodiment of the lithium solid-state battery, the solid electrolyte layer comprises a thickness in the range of 10 micron to 500 microns.

In another embodiment of the lithium solid-state battery, the solid electrolyte layer comprises a thickness in the range of 15 micron to 350 microns.

In another embodiment of the lithium solid-state battery, the solid electrolyte layer comprises a thickness in the range of 20 micron to 200 microns.

In another embodiment of the lithium solid-state battery, the solid electrolyte layer comprises a thickness in the range of 25 micron to 100 microns.

In another embodiment of the lithium solid-state battery, the solid electrolyte compositions are in the amount of 5% by mass to 80% by mass.

In another embodiment of the lithium solid-state battery, the solid electrolyte compositions are in the amount of 7.5% by mass to 70% by mass.

In another embodiment of the lithium solid-state battery, the solid electrolyte compositions are in the amount of 10% by mass to 60% by mass.

In another embodiment of the lithium solid-state battery, the solid electrolyte compositions are in the amount of 12.5% by mass to 50% by mass.

In another embodiment of the lithium solid-state battery, the solid electrolyte compositions are in the amount of 15% by mass to 40% by mass.

In another embodiment of the lithium solid-state battery, the solid electrolyte compositions are in the amount of 17.5% by mass to 30% by mass.

In an alternative embodiment, disclosed herein is a method for producing a sulfide solid electrolyte material including glass ceramics comprising: Li, T, X and A wherein T is at least one of Sb, P, As, Si, Ge, Al, B, and W; X is one or more halogens, pseudo-halogens, or N; A is one or more of S or Se; the method comprising mixing and milling a raw material composition containing an element A or compound $Li_2A$, an element T or sulfide of T, and a compound LiX or $Li_3N$ to render the mixture amorphous under x-ray diffraction; and/or heating the sulfide glass at a heat treatment temperature equal to or greater than a crystallization temperature of the sulfide glass to synthesize the glass ceramics having peaks at 2θ=14.5°±0.50°, 16.8°±0.50°, 23.9°±0.50°, 28.1°±0.50°, and 32.5°±0.50 in X-ray diffraction measurement with Cu-Kα(1,2)=1.54064 Å.

BRIEF DESCRIPTION OF DRAWINGS

The present disclosure may be understood by reference to the following detailed description taken in conjunction with the drawings briefly described below. It is noted that, for purposes of illustrative clarity, certain elements in the drawings may not be drawn to scale.

DETAILED DESCRIPTION OF ILLUSTRATED EMBODIMENTS

In the following description, specific details are provided to impart a thorough understanding of the various embodiments of the disclosure. Upon having read and understood the specification, claims, and drawings hereof, however, those skilled in the art will understand that some embodiments of the disclosure may be practiced without hewing to some of the specific details set forth herein. Moreover, to avoid obscuring the disclosure, some well-known methods, processes, devices, and systems finding application in the various embodiments described herein are not disclosed in detail.

Figure 1:
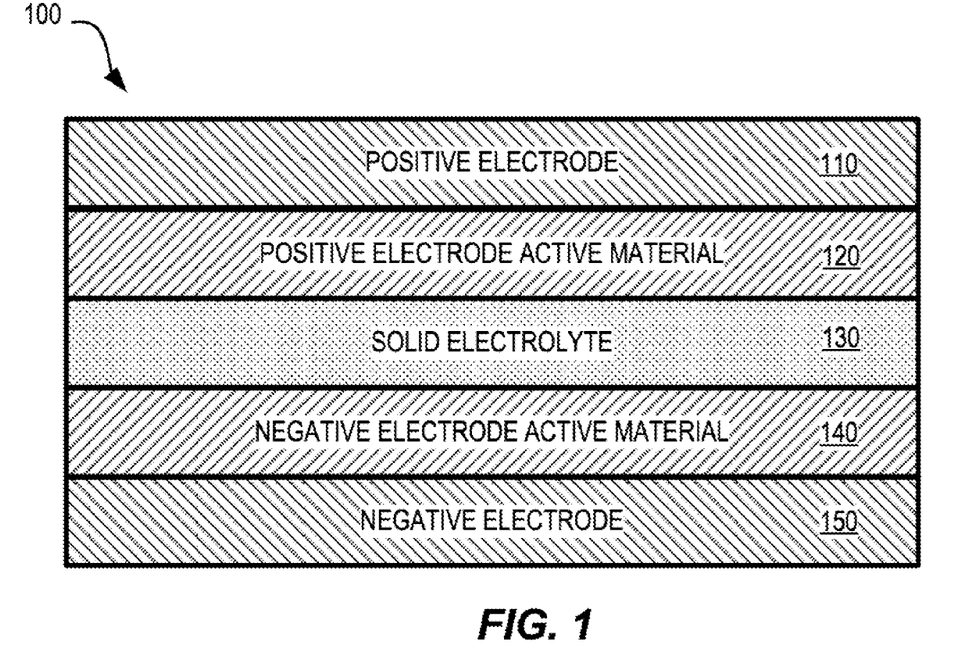
FIG. 1 is a schematic sectional view of an exemplary construction of a lithium solid-state electrochemical cell including a solid electrode composition, in accordance with an embodiment.

FIG. 1 is a schematic sectional view of an exemplary construction of a lithium solid-state electrochemical cell including an electrode composition of the present disclosure. Lithium solid-state battery 100 includes positive electrode (current collector) 110, positive electrode active material layer (cathode) 120, solid electrolyte layer 130, negative electrode active material layer (anode) 140, and negative electrode (current collector) 150. Solid electrolyte layer 130 may be formed between positive electrode active material layer 120 and negative electrode active material layer 140. Positive electrode 110 electrically contacts positive electrode active material layer 120, and negative electrode 150 electrically contacts negative electrode active material layer 140. The solid electrolyte compositions described herein may form portions of positive electrode active material layer 120, negative electrode active material layer 140 and solid electrolyte layer 130.

Positive electrode 110 may also be referred to as "positive electrode current collector" and may be a foil or plate formed from materials including, but not limited to, Aluminum (Al), Nickel (Ni), Titanium (Ti), Stainless Steel, Magnesium (Mg), Iron (Fe), Zinc (Zn), Indium (In), Germanium (Ge), Silver (Ag), Platinum (Pt), Gold (Au), Lithium (Li), or alloy thereof. In some embodiments, the positive electrode layer 110 may be formed from one or more carbon containing material, such as carbon fiber, graphite, graphene, carbon black, conductive carbon, amorphous carbon, VGCF, and carbon nanotubes.

Similarly, negative electrode 150, also known as a negative electrode current collector may be formed from Aluminum (Al), Nickel (Ni), Titanium (Ti), Stainless Steel, Magnesium (Mg), Iron (Fe), Zinc (Zn), Indium (In), Germanium (Ge), Silver (Ag), Platinum (Pt), Gold (Au), Lithium (Li), or alloy thereof. Negative electrode 150 may be omitted entirely if negative electrode active material 140 possesses adequate electronic conductivity and mechanical strength.

Positive electrode active material layer 120 may include, at least, a positive electrode active material including, but not limited to, metal oxides, metal phosphates, metal sulfides, sulfur, lithium sulfide, oxygen, or air. In some embodiments, the positive electrode active material layer 120 may include one or more of an NMC material which can be expressed as $Li(Ni_aCo_bMn_c)O_2$ (0<a<1, 0<b<1, 0<c<1, a+b+c=1) or, for example, NMC 111

($LiNi_{0.33}Mn_{0.33}Co_{0.33}O_2$), NMC 433 ($LiNi_{0.4}Mn_{0.3}Co_{0.3}O_2$), NMC 532 ($LiNi_{0.5}Mn_{0.3}Co_{0.2}O_2$), NMC 622 ($LiNi_{0.6}Mn_{0.2}Co_{0.2}O_2$), NMC 811 ($LiNi_{0.8}Mn_{0.1}Co_{0.1}O_2$) or a combination thereof. In another embodiment, the positive electrode active material layer 120 may include one or more of a metal oxide, such as but not limited to $V_2O_5$, $V_6O_{13}$, $MoO_3$, $LiCoO_2$, $LiNiO_2$, $LiMnO_2$, $LiMn_2O_4$, $LiNi_{1-Y}Co_YO_2$, $LiCo_{1-Y}Mn_YO_2$, $LiNi_{1-Y}Mn_YO_2$ ($0 \leq Y<1$), $Li(Ni_aCo_bMn_c)O_4$ ($0<a<2$, $0<b<2$, $0<c<2$, $a+b+c=2$), $LiMn_{2-Z}Ni_ZO_4$, $LiMn_{2-Z}Co_ZO_4$ ($0<Z<2$), $LiCoPO_4$, $LiFePO_4$, $CuO$, $Li(Ni_aCo_bAl_c)O_2$ ($0<a<1$, $0<b<1$, $0<c<1$, $a+b+c=1$) or a combination thereof. In yet another embodiment, the positive electrode active material layer 120 may include one or more of a metal sulfide include titanium sulfide ($TiS_2$), molybdenum sulfide ($MoS_2$), iron sulfide ($FeS$, $FeS_2$), copper sulfide ($CuS$), nickel sulfide ($Ni_3S_2$) and lithium sulfide ($Li_2S$), or combination thereof.

The positive electrode active material may be added in the amount of 20% by mass to 99% by mass; 30% by mass to 95% by mass; 40% by mass to 92.5% by mass; 50% by mass to 90% by mass; 60% by mass to 87.5% by mass; or 65% by mass to 85% by mass.

Positive electrode active material layer 120 may further include one or more solid electrolyte materials such as one or more of a $Li_2S$—$P_2S_5$, $Li_2S$—$P_2S_5$—$LiI$, $Li_2S$—$P_2S_5$—$GeS_2$, $Li_2S$—$P_2S_5$—$Li_2O$, $Li_2S$—$P_2S_5$—$Li_2O$—$LiI$, $Li_2S$—$P_2S_5$—$LiI$—$LiBr$, $Li_2S$—$SiS_2$, $Li_2S$—$SiS_2$—$LiI$, $Li_2S$—$SiS_2$—$LiBr$, $Li_2S$—$S$—$SiS_2$—$LiCl$, $Li_2S$—$S$—$SiS_2$—$B_2S_3$—$LiI$, $Li_2S$—$S$—$SiS_2$—$P_2S_5$—$LiI$, $Li_2S$—$B_2S_3$, $Li_2S$—$P_2S_5$—$Z_mS_n$ (where m and n are positive numbers, and Z is Ge, Zn or Ga), $Li_2S$—$GeS_2$, $Li_2S$—$S$—$SiS_2$—$Li_3PO_4$, and $Li_2S$—$S$—$SiS_2$-$Li_xMO_y$ (where x and y are positive numbers, and M is P, Si, Ge, B, Al, Ga or In). In another embodiment, one or more of the solid electrolyte materials may be $Li_3PS_4$, $Li_4P_2S_6$, $Li_7P_3S_{11}$, $Li_{10}GeP_2S_{12}$, $Li_{10}SnP_2S_{12}$. In a further embodiment, one or more of the solid electrolyte materials may be $Li_6PS_5Cl$, $Li_6PS_5Br$, $Li_6PS_5I$ or expressed by the formula $Li_{7-y}PS_{6-y}X_y$ where X represents at least one halogen elements and or pseudo-halogen and where $0<y \leq 2.0$ and where a halogen may be one or more of F, Cl, Br, I, and a pseudo-halogen may be one or N, NH, $NH_2$, NO, $NO_2$, $BF_4$, $BH_4$, $AlH_4$, CN, and SCN. In yet another embodiment, one or more of the solid electrolyte materials may be expressed by the formula $Li_{8-y-z}P_2S_{9-y-z}X_yW_z$ (where X and W represents at least one halogen elements and or pseudo-halogen and where $0 \leq y \leq 1$ and $0 \leq z \leq 1$) and where a halogen may be one or more of F, Cl, Br, I, and a pseudo-halogen may be one or N, NH, $NH_2$, NO, $NO_2$, $BF_4$, $BH_4$, $AlH_4$, CN, and SCN. The solid electrolyte compositions may be added in the amount of 5% by mass to 80% by mass.

The solid electrolyte material may be added in the amount of 7.5% by mass to 70% by mass; 10% by mass to 60% by mass; 12.5% by mass to 50% by mass; 15% by mass to 40% by mass; or 17.5% by mass to 30% by mass.

Positive electrode active material layer 120 may further include one or more carbon containing species which has an electronic conductivity greater than or equal to 1 mS/cm². The carbon containing species may consist of but are not limited to carbon black, graphite, graphene, carbon nanotubes, carbon fiber, VGCF, carbon black, or amorphous carbon. In another embodiment, the positive electrode active material layer 120 may further include one or more metal particles, filaments, or other structures.

The carbon containing species may be added to the positive electrode active material layer in the amount of 2% to 50% by mass; 4% to 40% by mass; 6% to 30% by mass; 8% to 25% by mass; 10% to 20; by mass; or 12% to 18% by mass.

Positive electrode active material layer 120 may further include one or more binder or polymers such as but not limited to a fluororesin containing vinylidene fluoride (VdF), hexafluoropropylene (HFP), tetrafluoroethylene (TFE), or derivatives thereof as structural units. Specific examples thereof include homopolymers such as polyvinylidene fluoride (PVdF), polyhexafluoropropylene (PHFP), and polytetrafluoroethylene (PTFE), and binary copolymers such as copolymers of VdF and HFP such as poly (vinylene difluoride-hexafluoropropylene) copolymer (PVdF-HFP), and the like. In another embodiment, the polymer or binder may be one or more of a thermoplastic elastomer such as but not limited to styrene-butadiene rubber (SBR), styrene-butadiene-styrene copolymer (SBS), styrene-isoprene block copolymer (SIS), styrene-ethylene-butylene-styrene (SEBS), polyacrylonitrile (PAN), nitrile-butylene rubber (NBR), polybutadiene, polyisoprene, Poly (methacrylate) nitrile-butadiene rubber (PMMA-NBR) and the like. In a further embodiment, the polymer or binder may be one or more of an acrylic resin such as but not limited to polymethyl (meth) acrylate, polyethyl (meth) acrylate, polyisopropyl (meth) acrylate polyisobutyl (meth) acrylate, polybutyl (meth) acrylate, and the like. In yet another embodiment, the polymer or binder may be one or more of a polycondensation polymer such as but not limited to polyurea, polyamide paper, polyimide, polyester, and the like. In yet a further embodiment, the polymer or binder may be one or more of a nitrile rubber may be used such as but not limited to acrylonitrile-butadiene rubber (ABR), polystyrene nitrile-butadiene rubber (PS—NBR), and mixtures thereof.

One or more of the binders or polymers may be added to the positive electrode active material layer in the amount of 1% mass to 80% by mass; 3% by mass to 70% by mass; 5% by mass to 60% by mass; 8% by mass to 50% by mass; 11% by mass to 40% by mass; or 14% by mass to 30% by mass.

Positive electrode active material layer 120 may have a thickness in the range of, for example, 1 µm to 1000 µm. In another embodiment, the thickness may be in the range of 2 µm to 900 µm. In yet another embodiment, the thickness may be in the range of 5 µm to 750 µm. In a further embodiment, the thickness may be in the range of 10 µm to 500 µm. In yet a further embodiment, the thickness may be in the range of 15 µm to 350 µm. In another embodiment, the thickness may be in the range of 20 µm to 200 µm. In a further embodiment, the thickness may be in the range of 25 µm to 100 µm.

Negative electrode active material layer 140 can be in the form of a plate, foil, or particles may include, at least one or more negative electrode active materials including, but not limited to, an alkali metal such as Lithium metal, Lithium alloys, Sodium metal, Sodium alloys, Potassium metal and Potassium alloys. In other embodiment, the negative electrode active material layer 140 may include one or more of an alkaline earth metal such as Magnesium metal, Magnesium alloys, Calcium metal, Calcium alloys. In a further embodiment, the negative electrode active material layer 140 may include one or more of a carbon containing species which has an electronic conductivity greater than or equal to 1 mS/cm². The carbon containing species may consist of but not limited to graphitic carbon, hard carbon, amorphous carbon, carbon black, vapor grown carbon fiber (VGCF), carbon nanotube, graphene or a combination thereof. In yet another embodiment, the negative electrode active material layer 140 may include one or more species that contain Silicon (Si), Tin ($S_n$), Iron (Fe), Germanium (Ge) or Indium (In).

The negative electrode active material may be added in the amount of 20% by mass to 100% by mass; 30% by mass to 95% by mass; 40% by mass to 92.5% by mass; 50% by mass to 90% by mass; 60% by mass to 87.5% by mass; or 65% by mass to 85% by mass.

Negative electrode active material layer 140 may further include a solid electrolyte material such as one or more of a $Li_2S—P_2S_5$, $Li_2S—P_2S_5—LiI$, $Li_2S—P_2S_5—GeS_2$, $Li_2S—P_2S_5—Li_2O$, $Li_2S—P_2S_5—Li_2O—LiI$, $Li_2S—P_2S_5—LiI—LiBr$, $Li_2S—SiS_2$, $Li_2S—SiS_2—LiI$, $Li_2S—SiS_2—LiBr$, $Li_2S—S—SiS_2—LiCl$, $Li_2S—S—SiS_2—B_2S_3—LiI$, $Li_2S—S—SiS_2—P_2S_5—LiI$, $Li_2S—B_2S_3$, $Li_2S—P_2S_5—Z_mS_n$ (where m and n are positive numbers, and Z is Ge, Zn or Ga), $Li_2S—GeS_2$, $Li_2S—S—SiS_2—Li_3PO_4$, and $Li_2S—S—SiS_2-Li_xMO_y$ (where x and y are positive numbers, and M is P, Si, Ge, B, Al, Ga or In). In another embodiment, one or more of the solid electrolyte materials may be $Li_3PS_4$, $Li_4P_2S_6$, $Li_7P_3S_{11}$, $Li_{10}GeP_2S_{12}$, $Li_{10}SnP_2S_{12}$. In a further embodiment, one or more of the solid electrolyte materials may be $Li_6PS_5Cl$, $Li_6PS_5Br$, $Li_6PS_5I$ or expressed by the formula $Li_{7-y}PS_{6-y}X_y$ where "X" represents at least one halogen elements and or pseudo-halogen and where $0<y\leq2.0$ and where a halogen may be one or more of F, Cl, Br, I, and a pseudo-halogen may be one or N, NH, $NH_2$, NO, $NO_2$, $BF_4$, $BH_4$, $AlH_4$, CN, and SCN. In yet another embodiment, one or more of the solid electrolyte materials may be expressed by the formula $Li_{8-y-z}P_2S_{9-y-z}X_yW_z$ (where "X" and "W" represents at least one halogen elements and or pseudo-halogen and where $0\leq y\leq1$ and $0\leq z\leq1$) and where a halogen may be one or more of F, Cl, Br, I, and a pseudo-halogen may be one or N, NH, $NH_2$, NO, $NO_2$, $BF_4$, $BH_4$, $AlH_4$, CN, and SCN.

The solid electrolyte compositions may be added to the negative electrode active material layer in the amount of 5% by mass to 80% by mass; 7.5% by mass to 70% by mass; 10% by mass to 60% by mass; 12.5% by mass to 50% by mass; 15% by mass to 40% by mass; or 17.5% by mass to 30% by mass.

Negative electrode active material layer 140 may include one or more carbon containing species which has an electronic conductivity greater than or equal to 1 mS/cm². The carbon containing species may consist of but not limited to carbon black, graphite, graphene, carbon nanotubes, carbon fiber, VGCF, carbon black, or amorphous carbon. In another embodiment, the positive electrode active material layer 120 may further include one or more particles, wires or filaments comprising materials such as but not limited to Gold (Au), Silver (Ag), Zinc (Zn), Magnesium (Mg), Aluminum (Al), Silicon (Si), Tin (Sn) or Iron (Fe).

The carbon containing species may be added to the negative electrode active material layer in the amount of 2% by mass to 80% by mass; 5% by mass to 70% by mass; 10% by mass to 60% by mass; 15% by mass to 50% by mass; 20% by mass to 45% by mass; or 25% by mass to 40% by mass.

Negative electrode active material layer 140 may further include one or more binder of polymer for such as but not limited to a fluororesin containing vinylidene fluoride (VdF), hexafluoropropylene (HFP), tetrafluoroethylene (TFE), and derivatives thereof as structural units. Specific examples thereof include homopolymers such as polyvinylidene fluoride (PVdF), polyhexafluoropropylene (PHFP), and polytetrafluoroethylene (PTFE), and binary copolymers such as copolymers of VdF and HFP such as poly (vinylene difluoride-hexafluoropropylene) copolymer (PVdF-HFP), and the like. In another embodiment, the polymer or binder may be one or more of a thermoplastic elastomer such as but not limited to styrene-butadiene rubber (SBR), styrene-butadiene-styrene copolymer (SBS), styrene-isoprene block copolymer (SIS), styrene-ethylene-butylene-styrene (SEBS), polyacrylonitrile (PAN), nitrile-butylene rubber (NBR), polybutadiene, polyisoprene, Poly (methacrylate) nitrile-butadiene rubber (PMMA-NBR) and the like. In a further embodiment, the polymer or binder may be one or more of an acrylic resin such as but not limited to polymethyl (meth) acrylate, polyethyl (meth) acrylate, polyisopropyl (meth) acrylate polyisobutyl (meth) acrylate, polybutyl (meth) acrylate, and the like. In yet another embodiment, the polymer or binder may be one or more of a polycondensation polymer such as but not limited to polyurea, polyamide paper, polyimide, polyester, and the like. In yet a further embodiment, the polymer or binder may be one or more of a nitrile rubber may be used such as but not limited to acrylonitrile-butadiene rubber (ABR), polystyrene nitrile-butadiene rubber (PS—NBR), and mixtures thereof.

One or more of the binders or polymers may be added to the negative electrode active material in the in the amount of 1% mass to 80% by mass; 3% by mass to 70% by mass; 5% by mass to 60% by mass; 8% by mass to 50% by mass; 11% by mass to 40% by mas; or 14% by mass to 30% by mass.

The thickness of negative electrode active material layer 140 may have a thickness in the range of, for example, 500 nm to 1000 μm. In another embodiment, the thickness may be in the range of 1 μm to 900 μm. In yet another embodiment, the thickness may be in the range of 5 μm to 750 μm. In a further embodiment, the thickness may be in the range of 10 μm to 500 μm. In yet a further embodiment, the thickness may be in the range of 15 μm to 350 μm. In another embodiment, the thickness may be in the range of 20 μm to 200 μm. In a further embodiment, the thickness may be in the range of 25 μm to 100 μm.

Solid electrolyte material included within solid electrolyte layer 130 is a solid electrolyte composition as described herein. In some embodiment, there may be more than one solid electrolyte material included within solid electrolyte layer 130 which may include one or more the sold electrolyte materials described in the positive electrode active material 120 and the negative electrode active material 140. Solid electrolyte layer 130 may include solid electrolyte compositions as described herein in the range of 1% by mass to 100% by mass. In another embodiment, 20% by mass to 97.5% by mass. In yet another embodiment, 40% by mass to 95% by mass. In a further embodiment, 60% by mass to 92.5% by mass. In yet another embodiment, 90% by mass to 80% by mass.

Further, solid electrolyte layer 130 may contain one or more binders as described in the positive electrode active material 120 and the negative electrode active material 140. Examples of the binder may include those materials used in the positive electrode material layer as well as additional self-healing polymers and poly(ethylene) oxide (PEO). A thickness of solid electrolyte layer 130 is in the range of 500 nm to 1000 μm. In another embodiment, the thickness may be in the range of 1 μm to 900 μm. In yet another embodiment, the thickness may be in the range of 5 μm to 750 μm. In a further embodiment, the thickness may be in the range of 10 μm to 500 μm. In yet a further embodiment, the thickness may be in the range of 15 μm to 350 μm. In another embodiment, the thickness may be in the range of 20 μm to 200 μm. In a further embodiment, the thickness may be in the range of 25 μm to 100 μm.

Although indicated in FIG. 1 as a lamellar structure, other shapes and configurations of solid-state electrochemical cells are possible. Most generally, a lithium solid-state battery may be produced by providing a positive electrode active material layer, a solid electrolyte layer, and a negative electrode active material layer sequentially layered and pressed between electrodes and provided within a housing.

Figure 2:
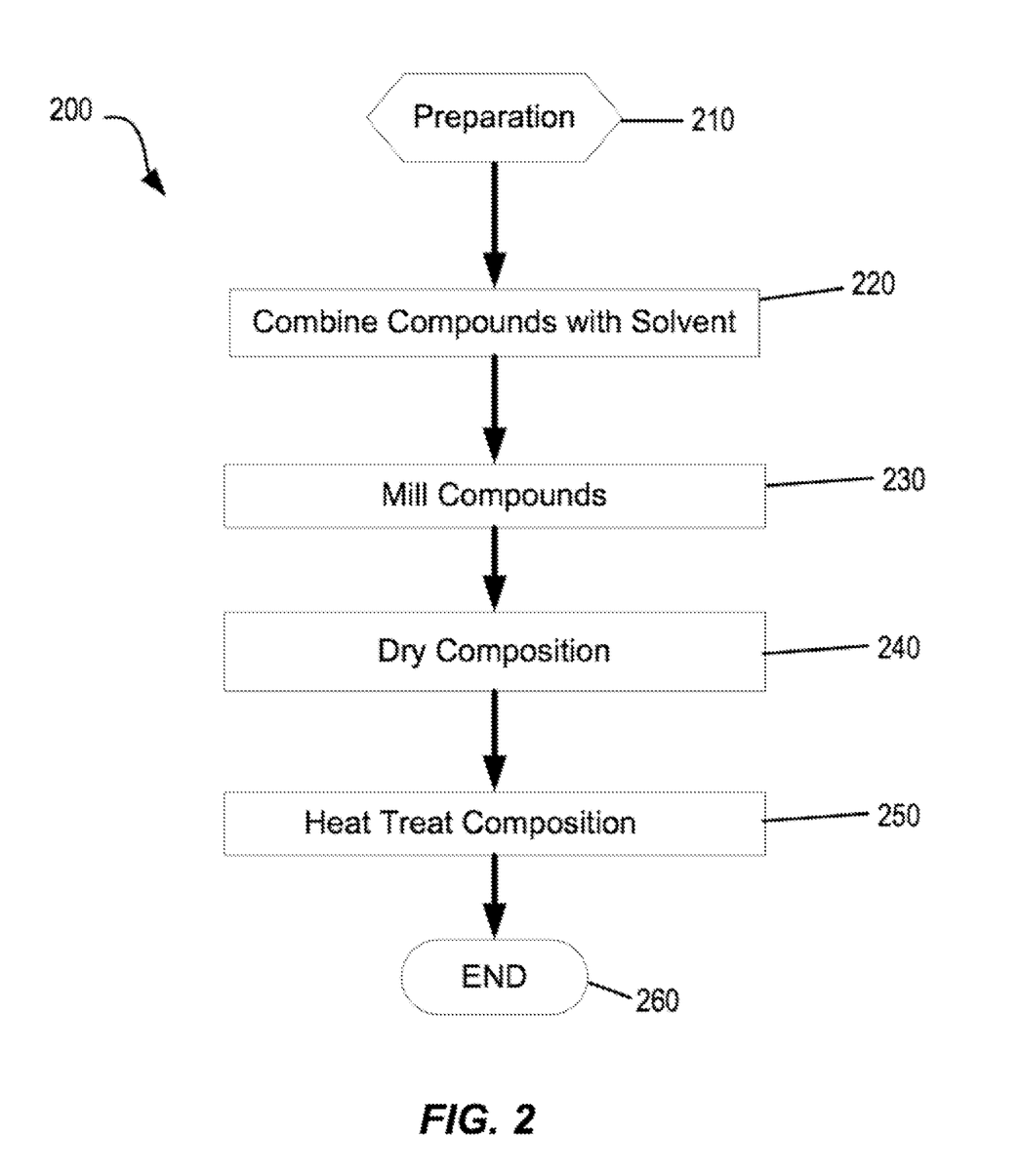
FIG. 2 is a flow chart of a process for producing a solid electrolyte composition, in accordance with an embodiment.

FIG. 2 is a flow chart of a process for producing a solid electrolyte composition useful for the construction of secondary electrochemical cells. Process 200 begins with preparation step 210 wherein any preparation action such as precursor synthesis, purification, and equipment preparation may take place. After any initial preparation, process 200 advances to step 220 wherein sulfur compounds, lithium compounds and other compounds, such as described herein, may be combined with an appropriate solvent and/or other liquids. Exemplary sulfur compounds may include, for example, elemental sulfur, Antimony Sulfide ($Sb_2S_3$), and lithium sulfide ($Li_2S$) typically in powder forms. Exemplary lithium compounds may include, for example, lithium metal (Li), lithium sulfide ($Li_2S$), and lithium nitride ($Li_3N$) typically in powder forms. Exemplary halides may include LiCl, LiBr, and LiI, while exemplary pseudo-halogens may include BH4, BF4, NO3, CN, SO3, OCN, SCN, and N3. Exemplary solvents may include, for example, but are not limited to, aprotic chain hydrocarbons such as heptane, aromatic hydrocarbons such as xylenes, and other solvents with a low propensity to generate hydrogen sulfide gas in contact with precursors or final electrolyte composition. The solvent is not particularly limited as long as it remains in the liquid state in part or in whole during the milling process at the desired milling temperature and does not participate in deleterious reactions with the solid electrolyte precursors or final solid electrolyte composition. The ratios and amounts of the various compounds is not specifically limited as long as the combination permits the synthesis of the desired composition and phase as indicated by the presence of specific X-ray diffraction features. The ratios and amounts may also vary according to specific synthesis conditions. For example, the ratio of solvent volume to precursor mass may need to be adjusted as solid electrolyte composition is adjusted to ensure complete milling of the precursors to generate the desired solid electrolyte phase discussed herein.

The amount of solvent added to the combination is not limited as long as the amount supports synthesis of the desired composition of solid electrolyte material. Multiple solvents may be mixed together with the noted compounds. Additional materials, such as co-solvents or polymers, may also be added during this step. Furthermore, the synthesis may be carried out with no solvent.

Next, in step 230 the composition may be mixed and/or milled for a predetermined period of time and temperature in order to create a solid electrolyte as described above. Mixing time is not specifically limited as long as it allows for appropriate homogenization and reaction of precursors to generate the solid electrolyte. Mixing temperature is not specifically limited as long as it allows for appropriate mixing and is not so high that a precursor enters the gaseous state. For example, appropriate mixing may be accomplished over 10 minutes to 60 hours and at temperatures from 20 to 120 degrees Celsius. Mixing may be accomplished using, for example, a planetary ball-milling machine or an attritor mill.

Next, in step 240, the composition may be dried in an inert atmosphere such as argon or nitrogen or under vacuum for a predetermined period of time and temperature. Following drying, heat treatment to crystallize the dried material may be performed during step 250. The temperature of heat treatment is not particularly limited, as long as the temperature is equal to or above the crystallization temperature required to generate the crystalline phase of the present disclosure. The material resulting from heat treatment step 250 may be single phase, and may also contain other crystalline phases and minor fractions of precursor phases.

Generally, the heat treatment time is not limited as long as the heat treatment time allows production of the desired composition and phase. The time may be in the range of, for example, one minute to 24 hours. Further, the heat treatment is conducted in an inert gas atmosphere (e.g., Argon) or under vacuum.

In final step 260, a completed composition may be utilized in the construction of electrochemical cells such as the cell of FIG. 1.

Other synthesis routes may be used as well. For example, a method comprising the mixing of suitable precursors providing components Li, T, X, and A in a solvent capable of causing reaction between the precursors, removal of the solvent, and heat treatment at a temperature equal to or greater than the crystallization temperature of the material may be used to synthesize the solid electrolyte material discussed herein.

EXAMPLES

Preparation of Solid Electrolytes

Example 1

Precursors including 4.26 g $Li_2S$ (Lorad Chemical Corporation), 10.49 g $Sb_2S_3$ (Sigma-Aldrich Co.), 8.27 g LiI (Sigma-Aldrich Co.), and 2.08 g Sulfur (Sigma-Aldrich Co.) are added to a 500 ml zirconia milling jar with zirconia milling media and compatible solvent (e.g. xylenes or heptane). The mixture is milled in a Retsch PM 100 planetary mill for 12 hours at 400 RPM. The material is collected and dried at 70° C. in inert (argon or nitrogen) environment. The resulting solid electrolyte powder ($Li_4SbS_4I$) of Example 1 can then be used in a positive electrode active material layer, solid electrolyte layer, and/or negative electrode active material layer Example 2

The solid electrolyte of Example 2 was prepared in the same manner as Example 1 except the mass of $Li_2S$, $Sb_2S_3$, $P_2S_5$, Sulfur Powder, and LiI were stoichiometrically selected to synthesis $Li_4Sb_{0.75}P_{0.25}S_4I$.

Comparative Example 1

The solid electrolyte of Comparative Example 1 was prepared in the same manner as Example 1 except the mass of $Li_2S$, $P_2S_5$, Sulfur Powder, and LiI were stoichiometrically selected to synthesize $Li_4PS_4I$.

Air and Moisture Exposure

Air and moisture exposure tolerance tests were conducted by taking 1 g each of Examples 1-2 and Counter Examples 1 and exposing the materials to an atmosphere of average dewpoint −47° C. for a duration of 4 hours. After the 4 hours had elapsed, the materials were collected and stored in an inert gas environment.

The sulfide solid electrolyte material resulting from the description of Example 1 comprises Li, T, X, and A, and has peaks at $2\theta=14.5°\pm0.50°$, $16.8°\pm0.50°$, $23.9°\pm0.50°$, 28.1°±0.50°, and 32.5°±0.50 in X-ray diffraction (XRD) measurement with Cu-Kα(1,2)=1.54064 Å which identify the novel crystalline phase. T is at least one of Sb, P, As, Si, Ge, Al, B, and W; A is at least one of S or Se; and X is one or more halogens or N. The chemical composition may be denoted as $Li_{1-a-b-c}T_aA_bX_c$; where values for a, b, and c may be in the ranges $0.074<a\leq0.105$, $0.370<b\leq0.421$, $0.074<c\leq0.105$. The composition may be mixed phase material with other crystalline phases identified by XRD peaks at 2θ=20.2° and 23.6° and/or peaks at 2θ=21.0° and 28.0°, and/or peaks at 17.5° and 18.2°, and/or peaks at 17.1° and 25.8°. The compositions may contain a crystalline phase associated with one or more lithium halides or lithium sulfide.

An exemplary composition is defined by $Li_{1-a-b-c}T_aA_bX_c$ where a=c=0.1, b=0.4, T=Sb, A=S, and X=I. Such a composition, after applying appropriate synthesis and heat treatment conditions, yields the crystalline phase of the present disclosure. The novel structure of this crystalline phase is conducive to high ionic conductivity. The presence of halogens may aid in the formation of stable, low-resistance interfaces against lithium metal and high voltage cathode active materials. Additionally, the presence of Sb may increase the air stability of the compound relative to other compounds not containing Sb.

Figure 3:
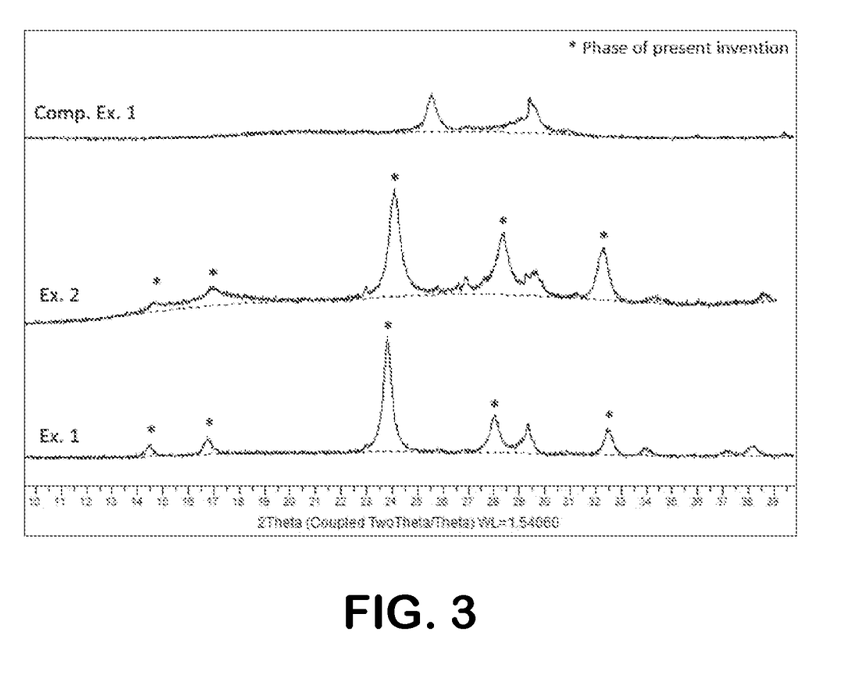
FIG. 3 is a plot of X-ray diffraction measurements of a solid electrolyte composition produced by the process indicated in FIG. 2, in accordance with an embodiment.

FIG. 3 is a plot of X-ray diffraction measurements of a solid electrolyte composition produced by the process indicated in FIG. 2 according to Example 1 and 2, and Comparative Example 1. The X-ray diffraction (XRD) measurements of Example 1 and 2 show dominant novel peaks indicative of a previously unknown crystalline phase at 2θ=14.5°±0.50°, 16.8°±0.50°, 23.9°±0.50°, 28.1°±0.50°, and 32.5°±0.50 with Cu-Kα(1,2)=1.54064 Å. In particular, the peak at 32.5°±0.50 has not been observed in the comparative examples or any other compositions similar to the present composition and can serve to highlight the novel crystalline phase of the present disclosure. Another exemplary example of peak positions would be 2θ=14.5°±0.20°, 16.8°±0.20°, 23.9°±0.20°, 28.1°±0.20°, and 32.5°±0.20 with Cu-Kα(1,2)=1.54064 Å. Other compositions may be mixed phase material with other crystalline phases identified by XRD peaks at 2θ=20.2° and 23.6° and/or peaks at 2θ=21.0° and 28.0°, and/or peaks at 17.5° and 18.2°, 17.1° and 25.8°, and/or peaks associated with one of more lithium halides. However, the X-ray diffraction measurements of the material described in Comparative Example 1 is missing the peaks at 2θ=14.5°±0.50°, 16.8°±0.50°, 23.9°±0.50°, 28.1°±0.50°, and 32.5°±0.50 with Cu-Kα(1,2)=1.54064 Å, thereby not conforming to the present disclosure. Additionally, Comparative Example 1 shows X-ray diffraction results from a stoichiometry that does not involve antimony, and therefore does not conform to the present disclosure.

Figure 4:
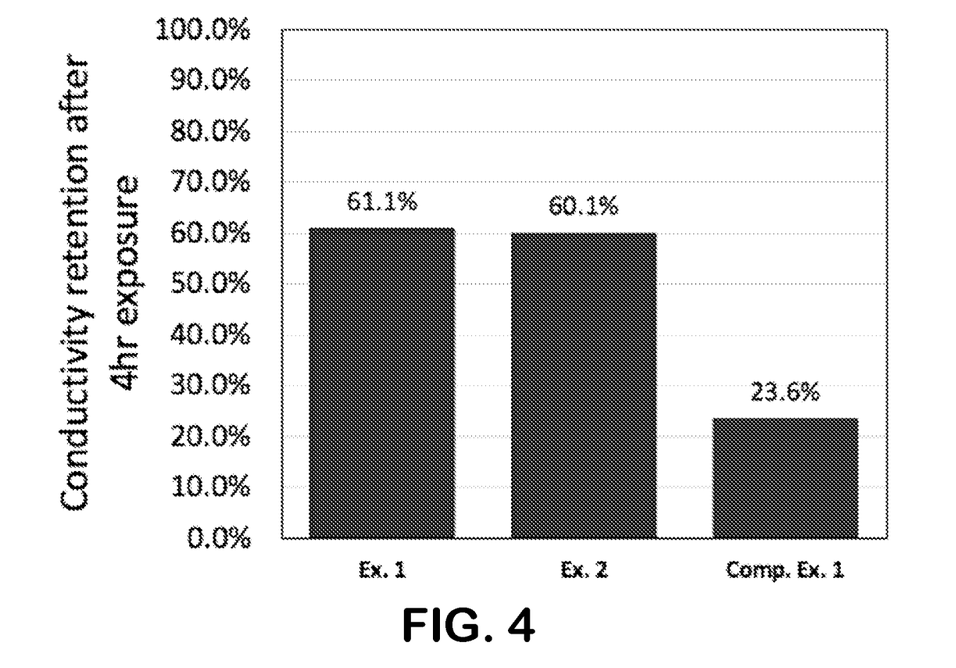
FIG. 4 is a plot indicating the conductivity of a solid-state electrochemical cell using a solid electrolyte composition of the present disclosure, in accordance with an embodiment.

FIG. 4 is a plot indicating the percentage of initial ionic conductivity remaining after a 4 hr exposure to an atmosphere of average dewpoint −47° C. From FIG. 4 it can be observed that after the exposure to atmosphere the solid electrolyte material described in Example 1, Example 2, all retain slightly more than 60% of their initial conductivity. However, the solid electrolyte material described in Comparative Example 1 shows a much lower conductivity retention which is derived from the lack of antimony in the composition.

Measured examples of the compositions provide conductivities of approximately 0.525 mS/cm² at room temperature for pure and mixed-phase electrolyte material in pellets compressed at room temperature. Higher conductivities may possibly be attained by an altered chemical stoichiometry and/or by compression at elevated temperatures or other processing methods and conditions.

Features described above as well as those claimed below may be combined in various ways without departing from the scope hereof. It should thus be noted that the matter contained in the above description or shown in the accompanying drawings should be interpreted as illustrative and not in a limiting sense.

What is claimed is:

1. A solid electrolyte material comprising Li, T, X and A, wherein T comprises Sb; X comprises one or more halogens, pseudo-halogens, or N; A comprises one or more of S or Se; and wherein the solid electrolyte material has peaks at 2θ=14.5°±0.50°, 16.8°±0.50°, 23.9°±0.50°, 28.1°±0.50°, and 32.5°±0.50 in X-ray diffraction measurement with Cu-Kα(1,2)=1.54064 Å.

2. The solid electrolyte material of claim 1 comprising a formula:

$$Li_{1-a-b-c}T_aA_bX_c$$

wherein $0.074<a\leq0.105$, $0.370<b\leq0.421$, $0.074<c\leq0.105$.

3. The solid electrolyte material of claim 2, wherein a=0.1, b=0.4, c=0.1, T=Sb, A=S, and X=I.

4. The solid electrolyte material of claim 1, wherein T comprises a blend of Sb and non-Sb elements selected from the group consisting of P, As, Si, Ge, Al, B, and W.

5. The solid electrolyte material of claim 1, wherein a proportion of Sb to total element T is 1% or greater.

6. The solid electrolyte material of claim 1, comprising at least one of glass ceramic phases, crystalline phases and mixed phases and further comprising an ionic conductivity greater than about 0.500 mS/cm at room temperature.

7. The solid electrolyte material of claim 6, wherein the mixed phases comprise other crystalline phases containing peaks at 20.2°±0.50° and 23.6°±0.50°, and/or 21.0°±0.50° and 28.0°±0.50°, and/or 17.5°±0.50° and 18.2°±0.50°, and/or 17.1° and 25.8° in X-ray diffraction measurement with Cu-Kα(1,2)=1.5418 Å.

8. A lithium solid-state battery comprising a positive electrode active material layer containing a positive electrode active material; a negative electrode active material layer containing a negative electrode active material; and a solid electrolyte layer disposed between the positive electrode active material layer and the negative electrode active material layer, wherein at least one of the positive electrode active material layer, the negative electrode active material layer, and the solid electrolyte layer comprises a solid electrolyte material comprising Li, T, X and A, wherein T comprises Sb; X comprises one or more halogens, pseudo-halogens, or N; A comprises one or more of S or Se; and wherein the solid electrolyte material has peaks at 2θ=14.5°±0.50°, 16.8°±0.50°, 23.9°±0.50°, 28.1°±0.50°, and 32.5°±0.50 in X-ray diffraction measurement with Cu-Kα(1,2)=1.54064 Å.

9. The lithium solid-state battery of claim 8, wherein the solid electrolyte material comprises the formula $Li_{1-a-b-c}T_aA_bX_c$ wherein $0.074<a\leq0.105$, $0.370<10.421$, $0.074<c\leq0.105$.

10. The lithium solid-state battery of claim 9, wherein a=0.1, b=0.4, c=0.1, T=Sb, A=S, and X=I.

11. The lithium solid-state battery of claim 8, wherein T further comprises a blend of Sb and non-Sb elements selected from the group consisting of Sb, P, As, Si, Ge, Al, B, and W.

12. The lithium solid-state battery of claim 8, wherein a proportion of Sb to total element T is 1% or greater.

13. The lithium solid-state battery of claim 8, wherein the solid-electrolyte material comprises at least one of glass, ceramic phases, crystalline phases or mixed phases.

14. The lithium solid-state battery of claim 13, wherein the mixed phases comprise other crystalline phases containing peaks at 20.2°±0.50° and 23.6°±0.50°, and/or 21.0°±0.50° and 28.0°±0.50°, and/or 17.5°±0.50° and 18.2°±0.50°, and/or 17.1° and 25.8° in X-ray diffraction measurement with Cu-Kα(1,2)=1.5418 Å.

15. The lithium solid-state battery of claim 8 wherein the positive electrode active material comprises one or more particles, wires, or filaments comprising at least one of aluminum, nickel, titanium, stainless steel, magnesium, iron, zinc, indium, germanium, silver, platinum, gold, lithium or alloy thereof.

16. The lithium solid-state battery of claim 8 wherein the negative electrode active material comprises at least one of an alkali metal comprising lithium metal, lithium alloys, sodium metal, sodium alloys, potassium metal, potassium alloys; or at least one of an alkali earth metal comprising magnesium metal, magnesium alloys, calcium metal, calcium alloys; and optionally wherein the negative electrode active material further comprises silicon, tin, iron, germanium, or indium.

17. The lithium solid-state battery of claim 8, wherein the positive electrode active material layer and the negative electrode active material layer each comprise one or more carbon containing materials comprising carbon fiber, graphite, graphene, carbon black, conductive carbon, amorphous carbon, VGCF, and carbon nanotubes; and wherein the carbon containing materials are added in the amount of 2% by mass to 50% by mass of the respective positive electrode active material layer or the negative electrode active material layer.

18. The lithium solid-state battery of claim 8, wherein the positive electrode active material layer and the negative electrode active material layer each comprise one or more of metal particles, filaments, or other structures;
wherein the positive electrode active material layer and the negative electrode active material layer each further comprise one or more binders or polymers comprising a fluororesin containing vinylidene fluoride (VdF), hexafluoropropylene (HFP), tetrafluoroethylene (TFE), and derivatives thereof;
wherein the positive electrode active material layer and the negative electrode active material layer each further comprise one or more binders or polymers comprising homopolymers comprising polyvinylidene fluoride (PVdF), polyhexafluoropropylene (PHFP), or polytetrafluoroethylene (PTFE), or binary copolymers comprising copolymers of VdF and HFP comprising poly(vinylene difluoride-hexafluoropropylene) copolymer (PVdF-HFP);
wherein the positive electrode active material layer and the negative electrode active material layer each further comprise one or more binders or polymers comprising thermoplastic elastomers comprising styrene-butadiene rubber (SBR), styrene-butadiene-styrene copolymer (SBS), styrene-isoprene block copolymer (SIS), styrene-ethylene-butylene-styrene (SEBS), polyacrylonitrile (PAN), nitrile-butylene rubber (NBR), polybutadiene, polyisoprene, or poly(methacrylate) nitrile-butadiene rubber (PMMA-NBR);
wherein the positive electrode active material layer and the negative electrode active material layer each further comprise one or more binders or polymers comprising an acrylic resin comprising polymethyl (meth) acrylate, polyethyl (meth) acrylate, polyisopropyl (meth) acrylate polyisobutyl (meth) acrylate, polybutyl (meth) acrylate;
wherein the positive electrode active material layer and the negative electrode active material layer each further comprise one or more binders or polymers comprising a polycondensation polymer comprising polyurea, polyamide paper, or polyimide, polyester; or
wherein the positive electrode active material layer and the negative electrode active material layer each further comprise one or more binders or polymers comprising nitrile rubber comprising acrylonitrile-butadiene rubber (ABR), polystyrene nitrile-butadiene rubber (PS-NBR), or mixtures thereof.

19. The lithium solid-state battery of claim 8, wherein the positive electrode active material layer and the negative electrode active material layer each comprise one or more binders or polymers present in the amount of 1% mass to 80% by mass.

20. The lithium solid-state battery of claim 8, wherein the lithium solid-state battery does not comprise a negative electrode and the negative electrode active material possesses sufficient electronic activity and mechanical strength so as to act as a negative electrode.

21. The lithium solid-state battery of claim 8, wherein the positive electrode active material layer comprises Li(Ni$_a$Co$_b$Mn$_c$)O$_2$ wherein 0<a≤1, 0<b≤1, 0<c≤1, a+b+c=1;
wherein the positive electrode active material layer comprises Li(Ni$_{0.33}$Co$_{0.33}$Mn$_{0.33}$)O$_2$, Li(Ni$_{0.4}$Co$_{0.3}$Mn$_{0.3}$)O$_2$, Li(Ni$_{0.5}$Co$_{0.2}$Mn$_{0.3}$)O$_2$, Li(Ni$_{0.6}$Co$_{0.2}$Mn$_{0.2}$)O$_2$, Li(Ni$_{0.8}$Co$_{0.1}$Mn$_{0.1}$)O$_2$ or a combination thereof;
wherein the positive electrode active material layer comprises one or more metal oxides comprising V$_2$O$_5$, V$_6$O$_{13}$, MoO$_3$, LiCoO$_2$, LiNiO$_2$, LiMnO$_2$, LiMn$_2$O$_4$, LiNi$_{1-Y}$Co$_Y$O$_2$, LiCo$_{1-Y}$Mn$_Y$O$_2$, LiNi$_{1-Y}$Mn$_Y$O$_2$ (0≤Y<1), Li(Ni$_a$Co$_b$Mn$_c$)O$_4$ (0<a<2, 0<b<2, 0<c<2, a+b+c=2), LiMn$_{2-Z}$Ni$_Z$O$_4$, LiMn$_{2-Z}$Co$_Z$O$_4$ (0<Z<2), LiCoPO$_4$, LiFePO$_4$, CuO, Li(NiaCobAlc)O$_2$ (0<a<1, 0<b<1, 0<c<1, a+b+c=1) or a combination thereof; or
wherein the positive electrode active material layer comprises one or more of a metal sulfide including titanium sulfide (TiS$_2$), molybdenum sulfide (MoS$_2$), iron sulfide (FeS, FeS$_2$), copper sulfide (CuS), nickel sulfide (Ni$_3$S$_2$) and lithium sulfide (Li$_2$S), or combination thereof.

22. The lithium solid-state battery of claim 8, wherein the positive electrode active material is present in the amount of 20% by mass to 99% by mass.

23. The lithium solid-state battery of claim 8, wherein the negative electrode active material is present in the amount of 20% by mass to 99% by mass.

24. The lithium solid-state battery of claim 8, wherein the positive electrode active material layer comprises one or more of Li$_2$S—P$_2$S$_5$, Li$_2$S—P$_2$S$_5$—LiI, Li$_2$S—P$_2$S$_5$—GeS$_2$, Li$_2$S—P$_2$S$_5$—Li$_2$O, Li$_2$S—P$_2$S$_5$—Li$_2$O—LiI, Li$_2$S—P$_2$S$_5$—LiI—LiBr, Li$_2$S—SiS$_2$, Li$_2$S—SiS$_2$—LiI, Li$_2$S—SiS$_2$—LiBr, Li$_2$S—S—SiS$_2$—LiCl, Li$_2$S—S—SiS$_2$—B$_2$S$_3$—LiI, Li$_2$S—S—SiS$_2$—P$_2$S$_5$—LiI, Li$_2$S—B$_2$S$_3$, Li$_2$S—P$_2$S$_5$—Z$_m$S$_n$ (where m and n are positive numbers, and Z is Ge, Zn or Ga), Li$_2$S—GeS$_2$, Li$_2$S—S—SiS$_2$—Li$_3$PO$_4$, and Li$_2$S—S—SiS$_2$—Li$_x$MO$_y$ (where x and y are positive numbers, and M is P, Si, Ge, B, Al, Ga or In);
wherein the positive electrode active material layer comprises one or more of Li$_3$PS$_4$, Li$_4$P$_2$S$_6$, Li$_7$P$_3$S$_{11}$, Li$_{10}$GeP$_2$S$_{12}$, Li$_{10}$SnP$_2$S$_{12}$;
wherein the positive electrode active material layer comprises one or more of Li$_6$PS$_5$Cl, Li$_6$PS$_5$Br, Li$_6$PS$_5$I or expressed by the formula $Li_{7-y}PS_{6-y}X_y$ wherein X represents at least one halogen elements and or pseudo-halogen and where $0<y\leq2.0$ and wherein a halogen comprises one or more of F, Cl, Br, I, and a pseudo-halogen comprises one or N, NH, $NH_2$, NO, $NO_2$, $BF_4$, $BH_4$, $AlH_4$, CN, and SCN; or wherein the positive electrode active material layer comprises one of more of a $Li_{8-y-z}P_2S_{9-y-z}X_yX_yW_z$ wherein X and W represents at least one halogen elements and or pseudo-halogen and wherein $0\leq y\leq1$ and $0\leq z\leq1$) and wherein a halogen comprises one or more of F, Cl, Br, I, and a pseudo-halogen comprises one or N, NH, NH, NO, $NO_2$, $BR_4$, CN, and SCN.

25. The lithium solid-state battery of claim 8, wherein the positive electrode active material layer comprises a thickness in the range of 1 micron to 1000 microns.

26. The lithium solid-state battery of claim 8, wherein the negative electrode active material layer comprises a thickness in the range of 500 nanometers to 1000 microns.

27. The lithium solid-state battery of claim 8, wherein the solid electrolyte layer material layer comprises a thickness in the range of 500 nanometers to 1000 microns.

28. The lithium solid-state battery of claim 8, wherein the solid electrolyte material is present in the positive electrode active material layer, the negative electrode active material layer, or the solid electrolyte layer in the amount of 5% by mass to 80% by mass.

29. A method for producing a sulfide solid electrolyte material including glass ceramics comprising: Li, T, X and A wherein T is at least one of Sb, P, As, Si, Ge, Al, B, and W; X is one or more halogens, pseudo-halogens, or N; A is one or more of S or Se; the method comprising mixing and milling a raw material composition containing an element A or compound Li2A, an element T or sulfide of T, and a compound LiX or Li3N to render the mixture amorphous under x-ray diffraction; and/or heating the sulfide glass at a heat treatment temperature equal to or greater than a crystallization temperature of the sulfide glass to synthesize the glass ceramics having peaks at $2\theta=14.5°\pm0.50°$, $16.8°\pm0.50°$, $23.9°\pm0.50°$, $28.1°\pm0.50°$, and $32.5°\pm0.50$ in X-ray diffraction measurement with Cu-K$\alpha$(1,2)=1.54064 Å.

* * * * *

UNITED STATES PATENT AND TRADEMARK OFFICE
CERTIFICATE OF CORRECTION

PATENT NO. : 12,015,119 B2  
APPLICATION NO. : 17/448648  
DATED : June 18, 2024  
INVENTOR(S) : Brian E. Francisco and Sean P. Culver Page 1 of 1

It is certified that error appears in the above-identified patent and that said Letters Patent is hereby corrected as shown below:

In the Claims

In Claim 9, Column 16, Line 58, '0.370<10.421' should be corrected to -- $0.370<b\leq0.421$ --;

In Claim 16, Column 17, Line 22, "optionally" should be deleted;

In Claim 21, Column 18, Line 38, 'Li(NiaCobAlc)O₂' should be corrected to -- $Li(Ni_aCo_bAl_c)O_2$ --;

In Claim 24, Column 19, Line 8, '$Li_{8-y-z}P_2S_{9-y-z}X_yX_yW_z$' should be corrected to -- $Li_{8-y-z}P_2S_{9-y-z}X_yW_z$ --;

In Claim 24, Column 19, Line 12, 'N, NH, NH' should be corrected to -- $N, NH, NH_2$ --;

In Claim 24, Column 19, Line 13, 'BR₄' should be corrected to -- $BF_4, BH_4, AlH_4$ --;

In Claim 27, Column 19, Line 21, "layer material" should be deleted;

In Claim 29, Column 20, Line 12, 'Li2A' should be corrected to -- $Li_2A$ --; and In Claim 29, Column 20, Line 13, 'Li3N' should be corrected to -- $Li_3N$ --.

Signed and Sealed this  
Twenty-ninth Day of October, 2024

Katherine Kelly Vidal  
*Director of the United States Patent and Trademark Office*